(12) United States Patent
Yokota et al.

(10) Patent No.: US 7,016,088 B2
(45) Date of Patent: Mar. 21, 2006

(54) IMAGE READING APPARATUS

(75) Inventors: Masahiko Yokota, Abiko (JP); Haruo Ishizuka, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 930 days.

(21) Appl. No.: 10/050,852

(22) Filed: Jan. 18, 2002

(65) Prior Publication Data
US 2002/0109868 A1 Aug. 15, 2002

(30) Foreign Application Priority Data
Jan. 19, 2001 (JP) ............................. 2001-012438

(51) Int. Cl.
*H04N 2/04* (2006.01)

(52) U.S. Cl. ...................... 358/474; 358/496; 358/497; 358/498

(58) Field of Classification Search ................ 358/474, 358/496, 497, 498, 483, 471
See application file for complete search history.

(56) References Cited

U.S. PATENT DOCUMENTS

| 5,610,731 A | | 3/1997 | Itoh ........................... 358/496 |
| 5,734,483 A | * | 3/1998 | Itoh ........................... 358/496 |
| 6,091,516 A | * | 7/2000 | Chang et al. ................ 358/474 |
| 6,285,441 B1 | * | 9/2001 | Takahara ..................... 355/67 |

FOREIGN PATENT DOCUMENTS

| JP | 7-288656 | 10/1995 |
| JP | 7-327109 | 12/1995 |
| JP | 11-68592 | 6/1999 |
| JP | 11-168592 | 6/1999 |
| JP | 3-364316 | 1/2003 |
| JP | 3-364316 | 8/2003 |

OTHER PUBLICATIONS

European Search Report dated Jul. 2, 2004, issued in connection with corresponding Application No. EP 02 00 1378.

* cited by examiner

*Primary Examiner*—Kimberly Williams
*Assistant Examiner*—Negussie Worku
(74) *Attorney, Agent, or Firm*—Fitzpatrick, Cella, Harper & Scinto

(57) ABSTRACT

An image reading apparatus includes an image reading unit having an image reader for reading an image; a first original carriage for carrying an original and for reading an original image in contact with the image reading unit, while moving; a second original carriage for carrying an original and for reading an original image in contact with the image reading unit while in a stationary state; a stay provided between the first original carriage and the second original carriage; an urging device for urging the image reading unit toward the first original carriage or toward the second original carriage; a guide portion, provided outside an image reading region, for guiding the image reading unit away from the stay when the image reading unit moves between the first original carriage and the second original carriage; and a member to be slidably guided relative to the guide when the image reading unit moves between the first original carriage and the second original carriage, the member to the guided being disposed at a balanced position in a moving direction of the image reading unit and being substantially in line contact with the guide portion.

13 Claims, 13 Drawing Sheets

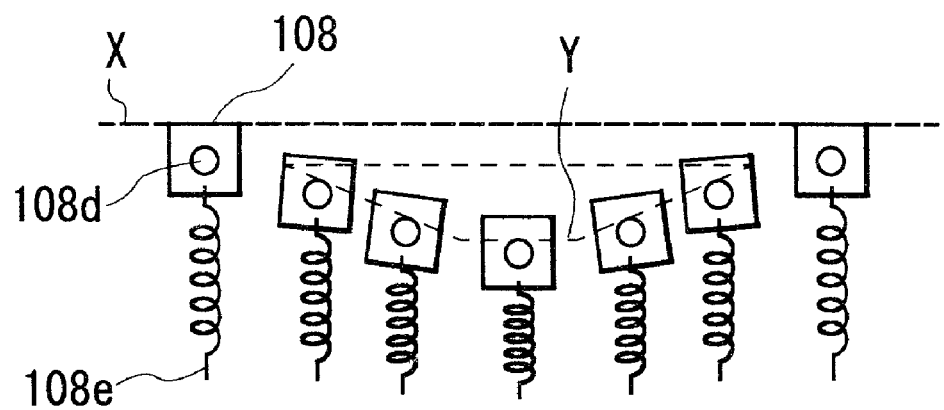
(a)
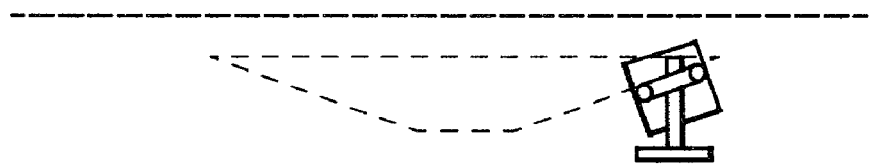
(b)
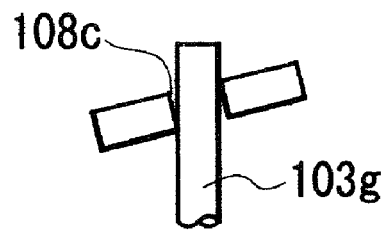
FIG. 8

IMAGE READING APPARATUS

FIELD OF THE INVENTION AND RELATED ART

The present invention related to an image reading apparatus used in an image forming apparatus such as a copying machine, a facsimile machine, a printer, or the like.

It has been known that some of plain copying machines, copying machines having the copying function as well a facsimile function, image scanners, or the like, are equipped with such an image reading apparatus that is capable of scanning an original in the form of a sheet in two different methods: a method in which an original is stationarily placed on an original placement glass platen and is scanned by moving an optical reading system, and a method in which an original is moved by an automatic document feeder (ADF) or the like and the moving original is scanned by a stationarily placed optical reading system.

Referring to FIG. 16, an image reading apparatus such as the one described above is provided with an image reading unit comprising a contact type image sensor (CIS) 1. The contact type image sensor 1 is placed in contact with an original placement glass platen and reads an original. It is placed under the original placement glass platen 2.

Also referring to FIG. 16, the contact type image sensor 1 is mounted on a carriage 5, which is movable along a guiding shaft 4. More specifically, the contact type image sensor 1 is attached to an arm 6 which is rotationally supported by the carriage 5, with the interposition of a rotational axle 61, so that the image sensor 1 can be rotated about the axle 61.

Further, the contact type image sensor 1 is kept pressed upon the original placement glass platen 2, by a spring 7, with the interposition of a spacer 8 between the contact type image sensor 1 and original placement glass platen 2. Therefore, the spacer 8 remains in contact with the bottom surface of the original placement glass platen 2, maintaining a predetermined distance between the original placement glass platen 2 and contact type image sensor 1.

With the provision of the above described structural arrangement, when reading an original D1 without moving the original D1, the stationary original D1 on the original placement glass platen 2 is read by moving the contact type image sensor 1 in the secondary scanning direction, whereas when reading an original D2 by moving the original, the original D2 is moved by the ADF, and the moving original D2 is read by the contact type image sensor 1 kept stationary in contact with the bottom surface of the second original placement glass platen 2a.

Next, referring to FIGS. 14 and 16, the contact type image sensor 1 will be described in more detail.

As shown in the drawings, the contact type image sensor 1 is provided with an LED 10 as a light source, and a light guiding member 11 for guiding light from the LED 10 to an original. The LED 10 is fixed to one of the lengthwise ends of the light guiding member 11, so that as the light emitted from the LED 10 advances through the light guiding member 11, while being repeatedly reflected by the interface between the light guiding member 11 and the ambience, the light is projected upon the original from across the entire lengthwise range of the light guiding member 11.

Referring to FIG. 15, the light projected from the light guiding member 11 illuminates the original D1 on the original placement glass platen 2 or the original D2 on the second original placement glass platen 2a, being reflected thereby. The reflected light is focused upon a primary photodetector array 13, for example, a CCD or the like, through a lens array with a short focal length (commercial name: Cellfoc lens array).

As described above, when reading a stationary original, the contact type image sensor 1 must be kept within the range of the original placement glass platen 2 to be moved relative to the original placement glass platen 2 in a manner to scan the original, whereas when reading an original by moving the original, the contact type image sensor 1 must be kept stationary relative to the second original placement glass platen 2a.

Referring to FIG. 16, the image reading apparatus is provided with a jump step 3, which is disposed between the original placement glass platens 2 and 2a. The jump step 3 is given the function of a conveying guide for guiding the original D2 upward, and the function of a stay for supporting the original placement glass platens 2 and 2a.

Since the jump step 3 is required to function as a stay, it is practically impossible to make the bottom surface of the jump step 3 perfectly level with the bottom surfaces of the original placement glass platens 2 and 2a; the bottom portion of the jump step 3 protrudes downward a certain distance below the bottom surfaces of the original placement glass platens 2 and 2a.

This downwardly protruding portion of the jump step 3 is in the path of the contact type image sensor 1 between the original placement glass platens 2 and 2a. Thus, in order to prevent the contact type image sensor 1 from colliding with the downwardly protruding portion of the jump step 3 when the contact type image sensor 1 is moved between the original placement glass platens 2 and 2a, some type of measure must be taken to keep the contact type image sensor 1 away from the jump step 3 while the contact type image sensor 1 is moved past the jump step 3.

Further, as pressure is applied by a holding/pressing plate 102 upon a relatively thick book placed on the glass platen to copy its pages, a load of approximately 98 N is applied to the original placement glass platen 2. In such a situation, the glass platen (which is as large as the size of an A3 paper, and is 4 mm in thickness) deforms downward, causing its center potion to displace downward approximately 0.8 mm, even though the distance between the contact type image sensor 1 and glass platen 2 remains unchanged. This downward deformation of the original placement glass platen 2 causes the aforementioned reflected light to be misfocused upon the photodetector array 13 while the contact type image sensor 1 is moved across the center portion of the original placement glass platen 2. In order to prevent this problem, the jump step 3 as a stay is required to have the function of reinforcing the original placement glass platen 2 in order to prevent the deformation of the original placement glass platen 2.

The contact type image sensor 1, which is kept the predetermined distance away from the bottom surface of the original placement glass platen 2 or 2a while being moved across the range correspondent to the downwardly protruding portion of the jump step 3, must be smoothly returned to the normal position with respect to the bottom surface of the original placement glass platen 2 or 2a. If it is not smoothly returned, it is possible for the space 8 to collide with the bottom surface of the original placement glass platen 2 or 2a hard enough for the original placement glass platen 2 or 2a to be damaged or soiled by the space 8. It is also possible for the contact type image sensor 1 to vibrate hard enough to adversely affect the image reading performance of the image reading apparatus.

Thus, contact type image sensor 1 must be smoothly displaced downward away from the bottom surface of the original placement glass platen 2 or 2a immediately before the contact type image sensor 1 is moved into the portion of its moving range correspondent to the position of the jump step 3, and then, must be smoothly placed back in contact with the bottom surface of the bottom surface of the original placement glass platen 2 or 2a as soon as the contact type image sensor is moved out of the portion of its moving range correspondent to the position of the jump step 3.

Japanese Laid-open patent Application 7-288656 discloses a method for keeping the contact type image sensor 1 away from the jump step 3 while the contact type image sensor is moved between the first and second original placement platens. According to this patent application, a combination of a rack, a pinion gear, a solenoid, and the like is used to downwardly displace the contact type image sensor 1 away from the platens. Thus, this method suffers from a problem that the employment of a motor, a solenoid, and the like increases the size of an image reading apparatus. The same patent application also discloses another method, according to which the contact type image sensor 1 is retracted from the edge of the first and second original placement platens by displacing the contact type image sensor 1 downward away from the platens with the use of a guiding projection placed between the first and second platens. This method, however, also suffers from the problem that when the contact type image sensor 1 is moved between the first and second platens, a plurality of rollers provided on the top surface of the contact type image sensor 1 collide with the guiding projection, possibly affecting the angle of the contact type image sensor 1.

SUMMARY OF THE INVENTION

The present invention was made to solve the above described problems of the prior arts. Thus, the primary object of the present invention is to provide an image reading apparatus provided with a simple structural arrangement capable of smoothly moving the image reading unit, in response to the selected image reading mode, between the original placement platen on which an original is stationarily placed to be read by an image reading unit which is being moved in a manner to scan the original, and the original placement platen across which an original is moved to be read by the image reading unit which is stationarily placed in contact with the platen, without allowing the image reading unit to collide with the member which supports the two original placement platens.

These and other objects, features, and advantages of the present invention will become more apparent upon consideration of the following description of the preferred embodiments of the present invention, taken in conjunction with the accompanying drawings.

BRIEF DESCRIPTION OF DRAWINGS

FIG. 7 is a schematic drawing for showing the behavior of the contact type image sensor in accordance with the present invention, during the period in which the contact type image sensor is displaced downwardly away from the original placement platen.

In FIG. 8, (a) and (b) are schematic drawings showing the behavior of a comparative example of a contact type image sensor, during the period in which the contact type image sensor is displaced downward away from the original placement platen.

DESCRIPTION OF THE PREFERRED EMBODIMENTS

Hereinafter, the preferred embodiments of the present invention will be described in detail with reference to the appended drawings.

Referring to FIGS. 1–13, an image reading apparatus and an image forming apparatus, which are in accordance with the present invention, will be described. In the following descriptions, the image forming apparatus will be described with reference to a copying apparatus.

Figure 1:
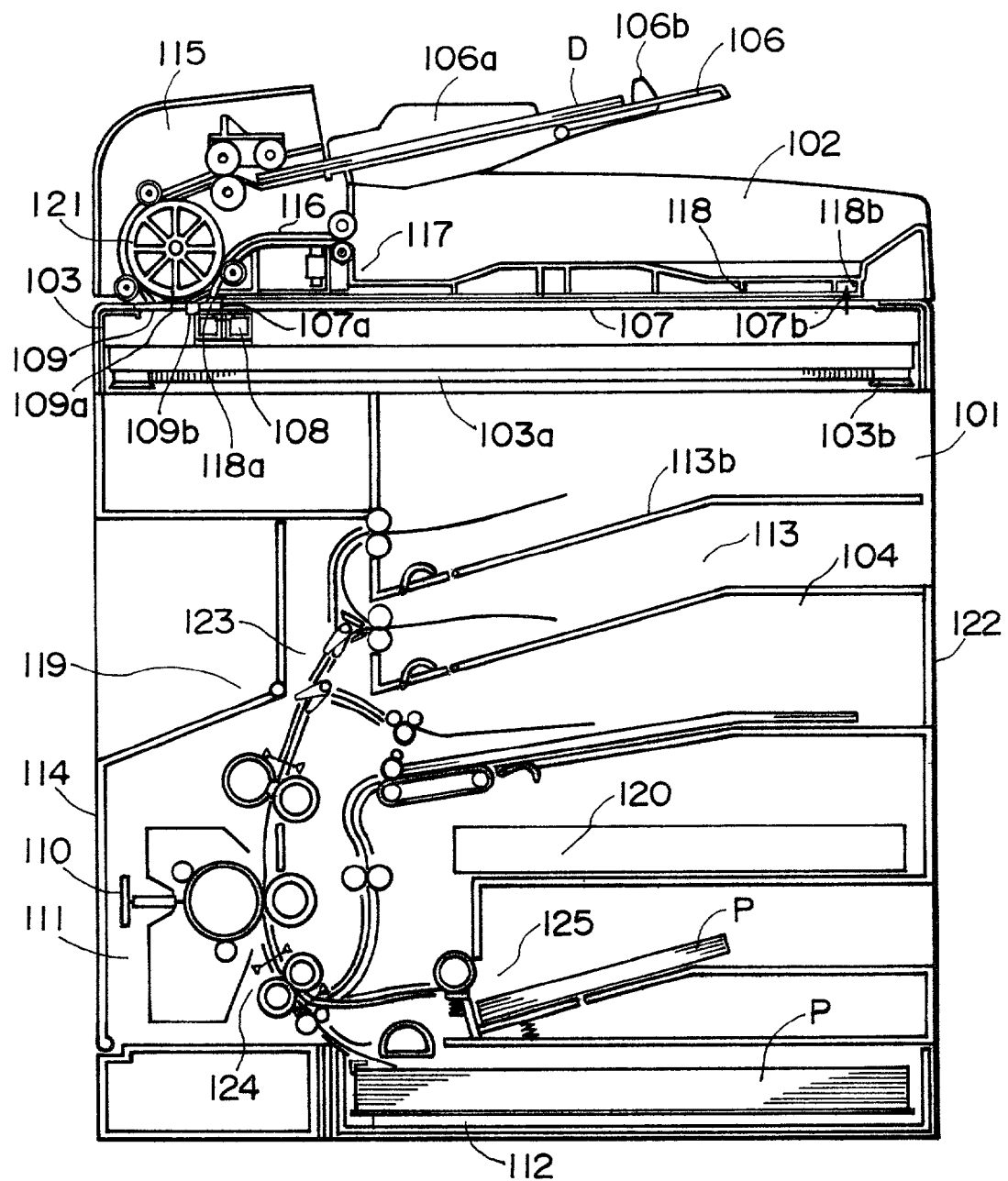
FIG. 1 is a sectional drawing of the image forming apparatus in accordance with the present invention, as seen from the front side of the apparatus.
Figure 2:
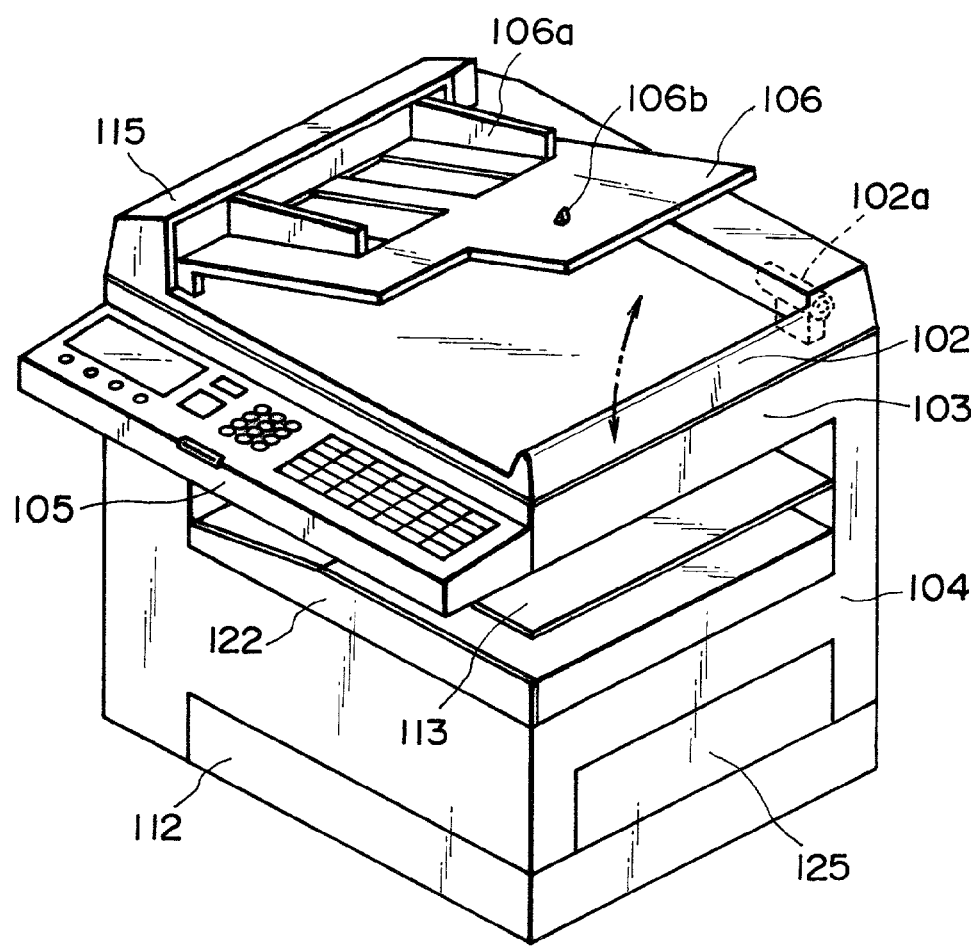
FIG. 2 is a perspective view of the image forming apparatus in accordance with the present invention.
Figure 3:
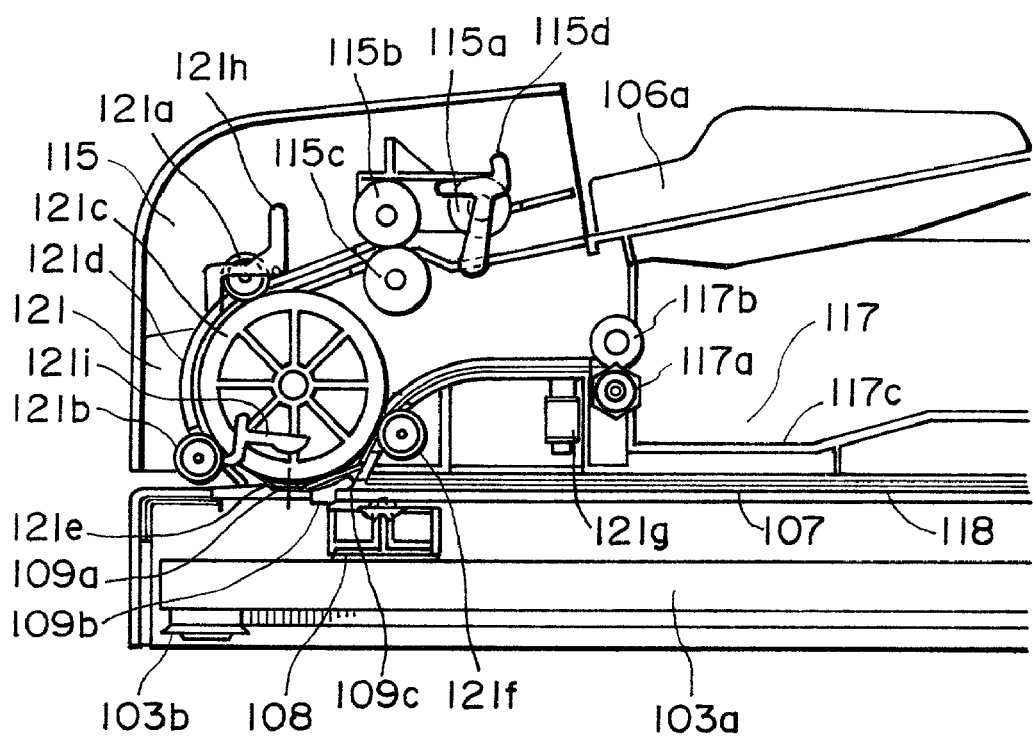
FIG. 3 is an enlarged sectional view of the image reading portion of the image forming apparatus in accordance with the present invention.

FIG. 1 is a sectional view of the image forming apparatus in accordance with the present invention, as seen from the front side of the apparatus, and FIG. 2 is a perspective view of the image forming apparatus in accordance with the present invention. FIG. 3 is an enlarged sectional view of the image reading portion of the image forming apparatus in accordance with the present invention.

First, the general structure of the image forming apparatus will be described.

Referring to FIGS. 1, 2, and 3, a referential code (or reference numeral) 101 designates the main assembly of the image forming apparatus, and a referential code 102 designates the holding/pressing plate of an ADF (automatic document feeder). The ADF separates one by one the plurality of originals D in the form of a sheet stored in layers therein, and conveys each sheet or original D. A referential code 103 designates an image reading portion which reads the surface of the original in the form of a sheet, or the surface of a given page of the original in the form of a book, on the original placement glass platen of the image reading portion, and a referential code 104 designates the main assembly of the image forming apparatus which employs an electrophotographic printing method which employs an LED array. A referential code 105 designates a control panel comprising a display, a set of input keys, and the like.

A referential code 106 designates the original feeding tray in which a single or a plurality of originals are placed to read the original by moving the original, and a referential code 107 designates an original placement glass platen (first original placement glass platen) on which the original is placed to read the original by moving the image reading portion. A referential code 108 designates a contact type image sensor, and a referential code 109 designates an original placement glass platen (second original placement glass platen) used to read the original by moving the original.

Designated by a referential code 110 is an LED head unit for forming a latent image on the peripheral surface of a photoconductive drum, and designated by a referential code 111 is an image forming portion provided with an image forming means (photoconductive drum or the like) for forming an image by carrying out one of the well known electrophotographic image formation processes. Designated by a referential code 112 is a sheet feeding cassette, in which a plurality of sheets of recording medium (recording paper or the like) on which an image is formed are stored, and from which the sheets of recording medium are fed out one by one while being separated from the next recording medium sheet. Designated by a referential code 113 is a sheet delivery portion, which is in the top portion of the image forming apparatus main assembly 104, and into which a plurality of the sheets P of recording medium can be discharged in a manner to be placed in layers.

A referential code 114 designates a cartridge cover, which is opened to expose the interior of the image forming apparatus main assembly 111 in order to mount or replace a cartridge in which a photoconductive drum or the like components are contained. A referential code 115 designates an ADF cover, which is opened to expose the sheet conveyance path in the ADF. A referential code 116 designates an original discharge path through which an original is conveyed to be discharged when reading the original while moving the original. A referential code 117 designates an original recovery tray into which an original is discharged when reading the original while moving the original. A referential code 118 designates a plate for holding down a plurality of bound originals in order to read one of them.

A referential code 119 designates the joint between the image reading portion 103 and image forming apparatus main assembly 104, and a referential code 120 designates a control portion of the image forming apparatus, or a facsimile apparatus, and a referential code 121 is a path through which an original is conveyed when reading the original by moving the original. A referential code 122 designates a cover for exposing the path through which a recording medium is conveyed in order to form an image on both surfaces of the recording medium, and a referential code 123 is a recording medium conveyance direction switching portion for switching the recording medium conveyance direction in order to form an image on both surfaces of the recording medium. A referential code 124 designates a recording medium registering portion for releasing a recording medium in synchronism with the starting of the image formation on the photoconductive drum, and a referential code 125 designates a sheet feeding portion, which is disposed within the image forming apparatus main assembly 104 and is capable of handling a plurality of recording medium sheets different in size.

Next, a method for reading an original while moving the contact type image sensor (method for reading one page of the bound original D1) will be described.

The holding/pressing plate 102 of the ADF is rotationally attached to the image reading portion 103 by a pair of its hinge portions 102a, which are located on the left and right sides, one for one, of the rear end of the apparatus (left side is unshown). The holding/pressing plate 102 can be rotated away from the image forming apparatus main assembly 104, or rotated back onto the image forming apparatus main assembly 104, by grasping the front side of the holding/pressing plate 102 (direction indicated by a double-headed arrow mark in FIG. 2).

The hinge portion 102a is provided with a combination of a damper, a cam, a spring, and the like, so that the holding/pressing plate 102 of the ADF can be held at a predetermined angle (for example, 70 deg.) to allow an original to be set on the original placement glass platen 107.

The basic structure of the contact type image sensor 108 is the same as those previously described regarding the prior arts. In other words, the light from the LED as a light source is guided by a light guiding member formed of resinous material or the like, and is projected onto the surface of the original, from which image formation data is obtained. Then, the light reflected by the original is focused by a Cellfoc lens (commercial name) as a focusing means onto a primary image sensing array comprising a plurality of photoelectric transducers; in other words, the image forming data are read from the original.

Figure 4:
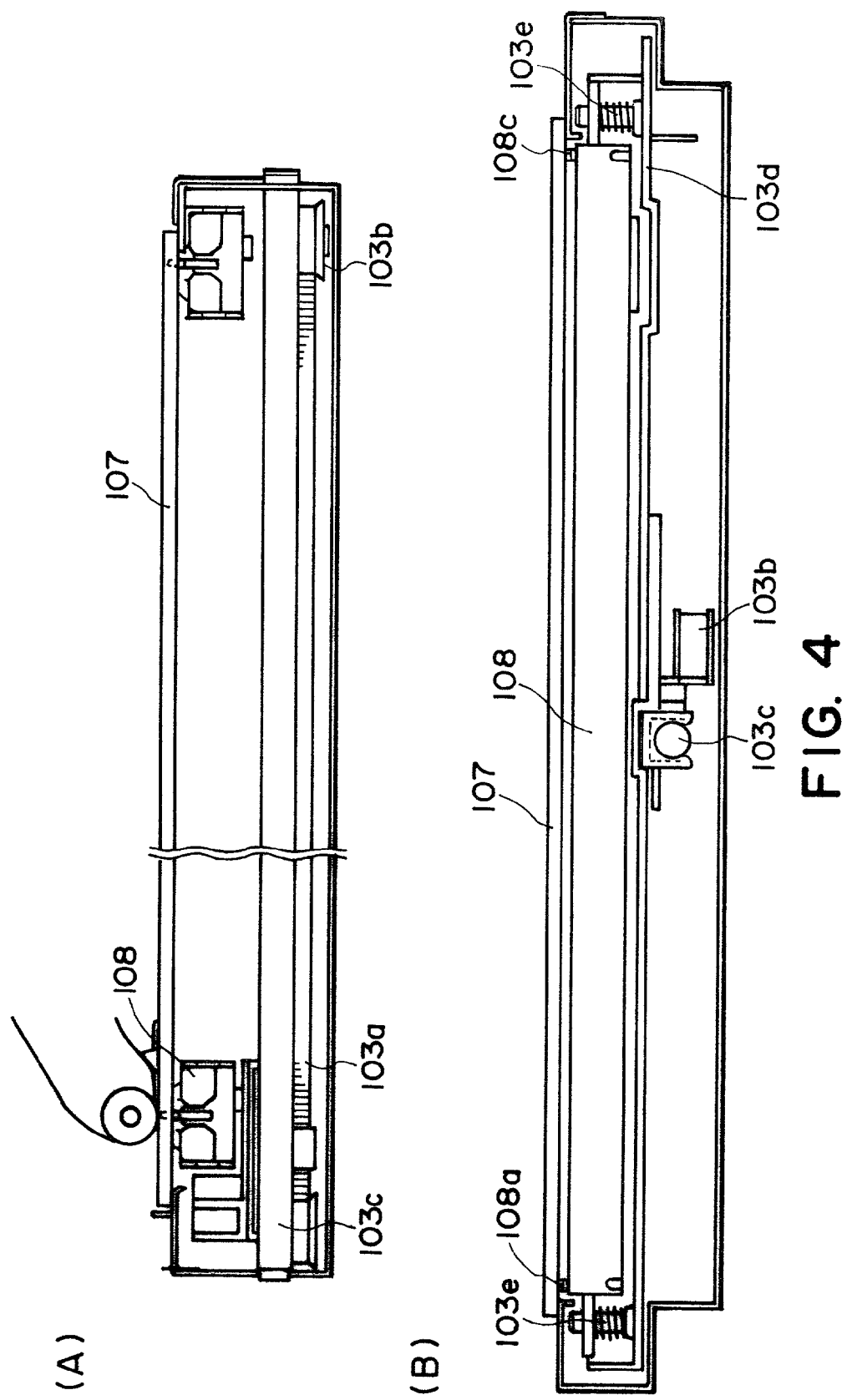
In FIG. 4, A and B are sectional views of the image reading portion of the image forming apparatus in accordance with the present invention, showing the internal structure thereof.

Referring to (A) and (B) of FIG. 4, the contact type image sensor 108 is movable in the left and right directions of the apparatus, following the guide shaft 103c. It can be moved to any point within its movable range by a driving pulley 103b and an unshown motor. The contact type image sensor 108 is supported by the guiding shaft 103c with the interposition of a carriage 103a, being kept under the upward pressure generated by a spring 103e as a pressure generating means.

Figure 9:
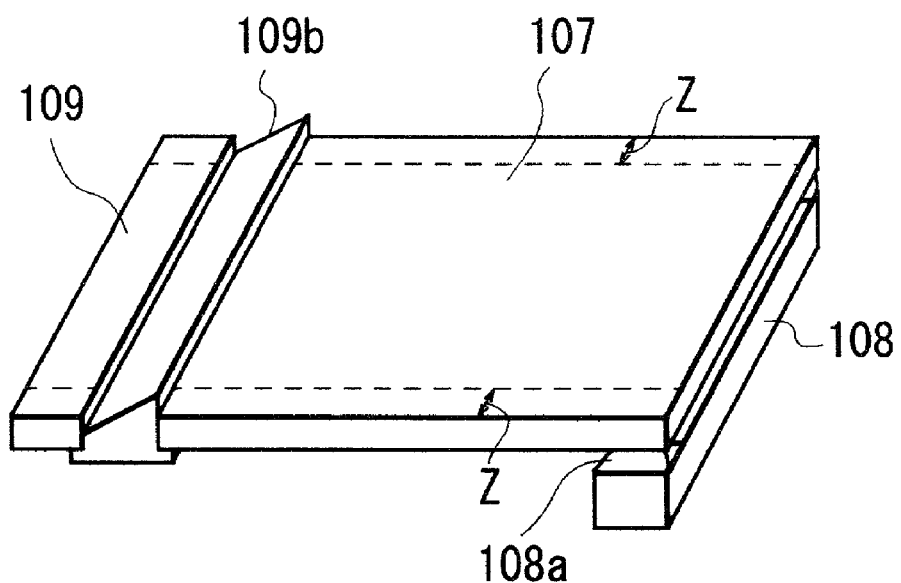
FIG. 9 is a schematic perspective drawing for showing the position of the spacer in the image reading apparatus in accordance with the present invention.

Disposed between the contact type image sensor 108 and original placement glass platen 107 are a pair of spacers 108a for keeping constant the distance between the contact type image sensor 108 and original placement glass platen 107. Referring to FIG. 9, the image reading portion is structured so that as the contact type image sensor 108 is moved, the spacers 108a move with the contact type image sensor 108, sliding on the bottom surface of the original placement glass platen 107, and so that the spacers 108a remain within zones Z, that is, the zones outside the range in which an original is read by the contact type image sensor 108. Therefore, the presence of the spacers 108a does not adversely affect the image reading performance of the image reading portion.

Further, in order to read an original on the original placement glass platen 107 with the use of the contact type image sensor 108, the contact type image sensor 108 is moved at a constant speed across a predetermined range, that is, from the reading starting position 107a to the reading ending position 107b.

A jump step 109b (sheet deflecting step) protrudes upward above the original placement glass platen 107, and its bottom surface is covered with a white sheet 109c so that when the image reading portion of the contact type image sensor 108 is below the jump step 109b, the contact type image sensor 108 is rectified in terms of shading. When reading an original by moving the contact type image sensor 108, each time an original is scanned by the contact type image sensor 108, the contact type image sensor 108 is rectified in terms of shading as it is moved below the jump step 109b, past the jump step 109b. This setup is effective to reduce the effects of the fluctuation of the output of the light source of the contact type image sensor 108, which occurs with the elapse of time.

The original pressing plate 118 is formed of laminar material comprising white sheet, sponge plate, and the like. It prevents an original on the original placement glass platen 107 from lifting or floating in the air. The left and right edges 118a and 118b of the original pressing plate 118 correspond to the reading starting position 107a and reading ending position 107b, of the reading range of the contact type image sensor 108 when reading the original by moving the contact type image sensor 108.

Next, the method for reading an original by moving the original (method for reading the original D2) will be described.

The separating portion 115 of the ADF comprises: a pickup roller 115a vertically movable by an unshown actuator; a separation roller 115b; a retardation roller 115a which is placed in contact with the separation roller 115b, and is rotated in the opposite direction with respect to the rotational direction of the separation roller 115b; and the like.

First, the original D2 in the form of a sheet is placed in the original feeding tray 106 so that the image to be copied faces upward. Then, the pickup roller 115a is pressed downward so that the original D2 is pushed out of the original feeding tray 106 and is fed between the separation roller 115b and retardation roller 115c. If two or more originals are pushed out of the original feeding tray 106 at the same time, they are separated one by one by the separation roller 115b kept pressed upon the retardation roller 115c. Then, each original is conveyed, by a reading/conveying roller 121c upon which separating/conveying rollers 121a and 121b are kept pressed by unshown springs, through a U-turn path, being guided by an original guide 121d.

Then, the original D2 is conveyed onto the glass platen 109 for reading an original by moving the original, and is conveyed further, being kept flatly pressed upon the glass platen 109 by the original pressing plate 121e kept under the pressure from an unshown spring.

The contact type image sensor 108 is held at the reading point 109a of the glass platen 109, and as the original D2 is moved past the reading point 109a, the downwardly facing surface of the original D2 is read by the contact type image sensor 108 to obtain the image formation data.

As the original D2 is conveyed past the reading point 109a, it is deflected toward the original holding/pressing plate 102 of the ADF by the jump step 109b, and then, is conveyed further by the reading/conveying roller 121c upon which the reading/conveying roller 121f is kept pressed by a spring.

Then, the original D2 is discharged into an original recovery tray 117c by a discharge roller 117b kept pressed against the discharge roller 117a by a spring. On the upstream side of the discharge roller 117b, a reading completion stamp 121g is disposed to make it possible to stamp a reading completion mark on the original D2.

The original feeding tray 106 is attached to the original holding/pressing plate 102 of the ADF, being rendered immovable relative to the original holding/pressing plate 102. The original feeding tray 106 is fitted with a slider 106a, which is slidable in the direction (widthwise direction of original D2) perpendicular to the direction in which original D2 is conveyed. A plurality of the originals D2 in the form of a sheet, placed in layers in the original feeding tray 106, can be vertically aligned by this slider 106a, at their lengthwise edges.

The original feeding tray 106 is also provided with an original length sensor 106b, which is on the upwardly facing surface of the actual tray portion of the original feeding tray 106 so that the length of the original D2 placed in the tray portion can be detected. The original separating portion 115 of the ADF is provided with a plurality of original width sensors 115d, which are distributed in the widthwise direction of the original D2, so that the width, as well as presence or absence, of the original D2 can be detected. The size and orientation of the original D2 can be detected by the combined outputs of the original width sensors 115d and original length sensor 106b.

The original conveyance path 121 is provided with an original conveyance sensor 121h and an original edge sensor 121i. The original conveyance sensor 121h detects whether or not the original D2 has been released from the separating portion 115 of the ADF, and whether or not the trailing edge of the original D2 has passed. The original edge sensor 121i detects the passages of the leading and trailing edges of the original D2, and its outputs are used to control the reading timing.

Next, referring to FIGS. 5–13, the contact type image sensor 108 and its reading operation will be described in more detail.

Figure 5:
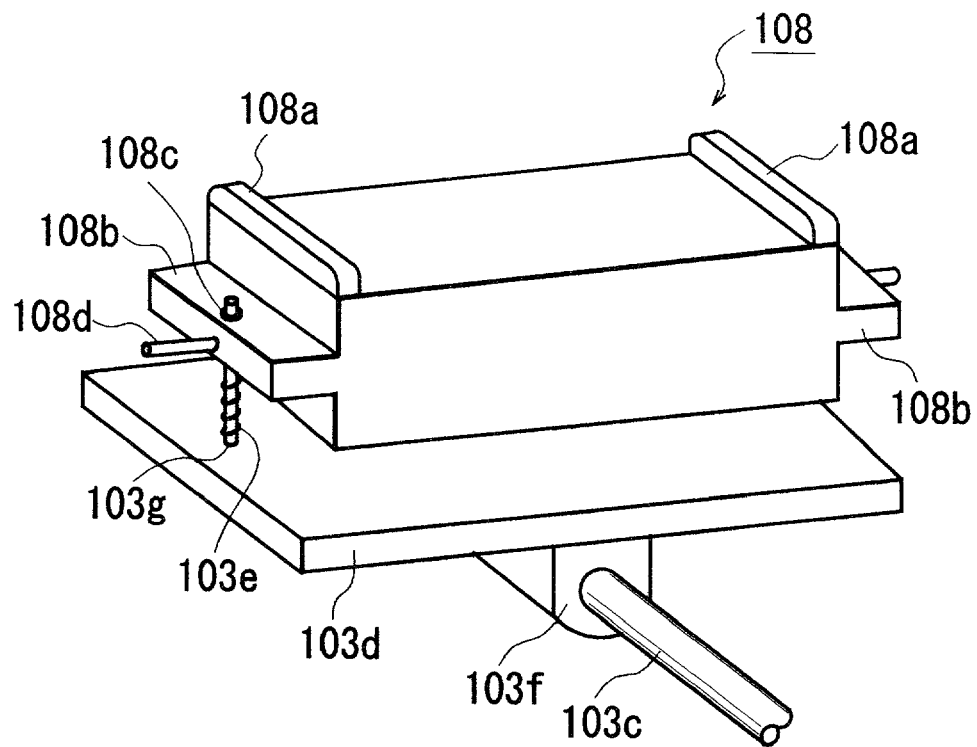
FIG. 5 is a schematic perspective view of a contact type image sensor in accordance with the present invention, in the image reading portion.

FIG. 5 is a schematic perspective view of the contact type image sensor 108 mounted on the image reading portion 103.

As shown in the drawing, the guide shaft 103c is put through the bearing 103f of the carriage 103d so that the carriage 103d can be moved following guide shaft 103c.

Each of the widthwise end portions (portions outside image reading range) of the carriage 103d is provided with a boss 103g as a positioning shaft for positioning the contact type image sensor 108 relative to the carriage 103. Around this boss 103g, a spring 103e as a pressure generating means is fitted.

On the other hand, each of the widthwise end portions (portions outside image reading range) of the contact type image sensor 108 is provided with a protrusion 108b, which is provided with a through-hole 108c.

The protrusion 108b is provided with a guided member 108d as a member for assisting the contact type image sensor 108 to be displaced from the original placement glass platen 107.

Figure 6:
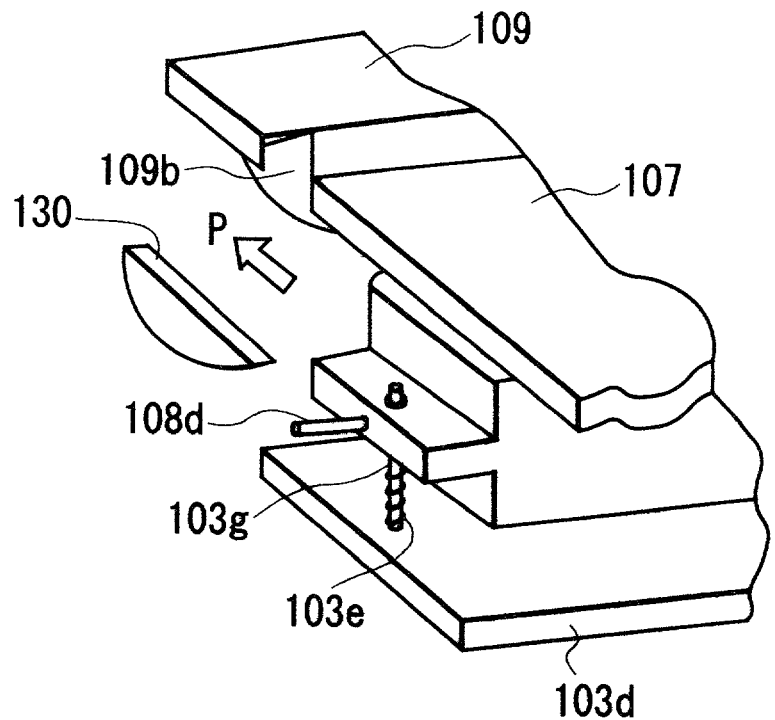
FIG. 6 is a schematic perspective view of the essential portions of the contact type image sensor and jump step, in the image reading portion in accordance with the present invention, and shows the positioning and structures thereof.

FIG. 6 is a schematic perspective view of the essential portions of the contact type image sensor 108 when the contact type image sensor 108 is in the adjacencies of the jump step 109b.

The jump step 109b is given the function of a guide for guiding the original D2 away from the glass platen 109 when the original is moved to be read by the contact type image sensor 108 in the stationary state, and also the function of a stay for supporting the original placement glass platens 107 and 109.

Regarding the rigidity of the jump stop 109b, the following has been known. That is, assuming that 4 mm thick chemically reinforced glass is used as the material for the original placement glass platen 107 capable of handling an original as large as an A3 sheet, in order for the jump step 109b to function as a stay for preventing the original placement glass platen 107 from flexing, in terms of its widthwise direction, the following equation must be satisfied:

$$E \cdot I = 6.5 \times 10^6 \text{ kg} \cdot \text{mm}^2$$

E: Young's modulus
I: second moment of area.

Therefore, the jump step 109b needs to have a certain amount of thickness. Thus, practically, it is very difficult to make the bottom surface of the jump step 109b flush with the bottom surfaces of the original placement glass platens 107 and 109; in other words, the bottom portion of the jump step 109b protrudes more or less downward with reference to the bottom surfaces of the original placement glass platens 107 and 109.

Thus, when moving the contact type image sensor 108 from the portion of the moving range of the contact type image sensor 108 correspondent to the original placement glass platen 107 to the portion of the moving range of the contact type image sensor 108 correspondent to the original placement glass platen 109 (direction indicated by arrow mark P in FIG. 6), or vice versa, the contact type image sensor 108 has to be displaced a certain distance from the original placement glass platens 107 and 109. For this purpose, the main assembly of the image reading portion 103 is provided with an image sensor displacement guide 130.

With the provision of the above described structural arrangement, when the contact type image sensor 108 is placed in the portion of its moving range correspondent to the original placement glass platen 107 or 109 in order to read an original, the spacers 108a are in contact with the bottom surface of the original placement glass platen 107 or 109, respectively.

On the other hand, when the contact type image sensor 108 is moved past the jump step 109b, for example, when the contact type image sensor 108 is moved past the jump step 109b in the direction indicated by the arrow mark P in FIG. 6, the guided member 108d comes into contact with the contact type image sensor displacement guide 130, and slides on the bottom surface of the guide 130.

Consequently, the contact type image sensor 108 is displaced downward against the resiliency of the spring 103e as the contact type image sensor 108 is moved past the jump step 109b in the direction of the arrow mark P. Therefore, the contact type image sensor 108 is smoothly moved past the jump step 109b in the direction of arrow mark P, without coming in contact with the jump step 109b.

Next, the location of the contact type image sensor 108, to which the guided member 108d is attached, will be described in more detail.

Primarily, the guided member 108d is located so that the leading and trailing sides of contact type image sensor 108 with respect to the guided member 108d, in terms of the moving direction of the contact type image sensor 108, balance with each other, in weight, in the pressure from the pressure generating means, and in the force to which the contact type image sensor 108 is subjected as the guided member 108d comes into contact, or remains in contact, with the bottom surface of the contact type image sensor displacement guide 130.

The leading and trailing halves of the contact type image sensor 108 in this embodiment, in terms of the moving direction of the contact type image sensor 108, are symmetrical with respect to the line which divides the contact type image sensor 108 into the leading and trailing halves. Therefore, the location of the contact type image sensor 108 to which the guided member 108d must be attached to realize the above described balance between the leading and trailing halves of the contact type image sensor 108 is the center of the contact type image sensor 108 in terms of the moving direction of the contact type image sensor 108.

The placement of the guided member 108d at the location at which the guided member 108d can realize the above described balance between the leading and trailing halves of the contact type image sensor 108 makes it possible to keep the contact type image sensor 108 stable to present the optical axis of the contact type image sensor 108 from tilting (tilting of the optical axis results in a blurred image).

Further, the contact type image sensor 108 exactly follows the bottom surface of the original placement glass platen 107. In other words, even if the original placement glass platen 107 is somewhat curved or wavy, the spacers 108a follow the curved or wavy surface of the original placement glass platen 107, keeping constant the distance between the original placement glass platen 107 and contact type image sensor 108. Therefore, the original D1 is accurately read. Further, this setup can reduce the amount of the focusing error resulting from component tolerance, minimizing therefore the tilting of the optical axis of the contact type image sensor 108. Therefore, the original D1 is accurately read.

As shown in FIG. 7, which is a schematic drawing for showing the behavior of the contact type image sensor 108 during the period between when it is downwardly displaced from the original placement glass platen 107 or 109 and when it is placed back in contact with the original placement glass platen 109 or 107, respectively, the placement of the guided member 108d at the location, at which the leading and trailing sides of the contact type image sensor 108 with respect to the guided member 108d are balanced in weight, minimizes the inclination of the contact type image sensor 108 while the contact type image sensor is kept away from the original placement glass platens 107 and 109. Therefore, the contact type image sensor 108 can be smoothly displaced downward from the original placement glass platen 107 or 109, and placed back in contact with the original placement glass platen 109 or 107, respectively.

Therefore, the spacer 108a gently comes into contact with the original placement glass platen 107 or 109, eliminating the possibility that the glass platen will be damaged or soiled. Further, the contact type image sensor 108 is prevented from violently vibrating, and therefore, it can accurately read the originals.

Secondly, the guided member 108d is attached to the contact type image sensor 108 so that its axial line coincides with the point of the contact type image sensor 108 upon which the pressure from the pressure generating member converges.

More concretely, if the spring 103e as a pressure generating member is mounted as in this embodiment, the point upon which the pressure generated by the spring converges, coincides with the axial line of the spring. Therefore, in this embodiment, the position of the guided member 108*d* relative to the contact type image sensor 108 in terms of the moving direction of the contact type image sensor 108 coincides with the position of the boss 103*g*, or the spring shaft, relative to the contact type image sensor 108 in terms of the moving direction of the contact type image sensor 108.

Since the guided member 108*d* in this embodiment is in the form of a shaft, the axis of the guided member 108*d* perpendicularly intersects with the axial line of the spring shaft, or the boss 103*g*.

The reason for the provision of the above described positional relationship is as follows. The guided member 108*d* is subjected to the reactive force resulting from the pressure from the pressure generating means, or the spring, as it slides on the bottom surface of the contact type image sensor displacement guide 130. Thus, if the positional relationship between the contact type image sensor 108, guided member 108*d*, and spring is designed so that there will be a distance between the point of the contact type image sensor 108, to which the pressure from the pressure generating means converges, and the point of the contact type image sensor 108, to which the guided member 108*d* is attached, in terms of the direction in which the contact type image sensor 108 is moved, the pressure from the pressure generating means, or the spring, acts to rotate the contact type image sensor 108 about the axial line of the guided member 108*d*; rotational moment is generated in the contact type image sensor 108.

In other words, the pressure applied to the contact type image sensor 108 from the pressure generating means in order to keep the contact type image sensor 108 in contact with the original placement glass platen 107 or 109 acts to generate moment in the contact type image sensor 108, destabilizing the behavior of the contact type image sensor 108.

This is why, in this embodiment, the above described positional and structural arrangement was made for balancing the contact type image sensor 108 to prevent the generation of the above described moment.

As a result, it became possible to keep the contact type image sensor 108 stable during its movement in order to maintain the image reading performance of the contact type image sensor 108 at an optimal level. Also, the contact type image sensor 108 could be smoothly displaced downward from the original placement glass platen 107 or 109, and placed back in contact with the original placement glass platen 109 or 107, respectively.

Thirdly, the guided member 108*d* is disposed close to the point of the contact type image sensor 108, to which the pressure from the pressure generating means converges.

To describe more concretely, when the spring 103*e* is employed as a pressure generating means as in this embodiment, it is placed close to the point of the contact type image sensor 108, to which the pressure from the spring 103*e* converges, that is, the point of the contact type image sensor 108, which is in contact with the spring 103*e*, in terms of the horizontal direction perpendicular to the direction in which the contact type image sensor 108 is moved.

Placing the guided member 108*d* close to the converging point of the pressure from the pressure generating means makes it possible to prevent the contact type image sensor 108 from tilting. Therefore, the contact type image sensor 108 remains stable in behavior during its scanning movement, and is smoothly displaced from the original placement glass platen 107 or 109, and smoothly placed back in contact with the original placement glass platen 109 or 107, respectively.

For comparison regarding the positioning of a guided member, the behavior of a contact type image sensor provided with a pair of guided members located at the leading and trailing ends, one for one, in terms of the moving direction of the contact type image sensor will be described with reference to FIG. 8.

When both the leading and trailing ends of the contact type image sensor 108 are provided with the guided member 108*d*, one of the guided members 108*d* (guided member 108*d* on the left side in the case of FIG. 8) comes into contact with the guide 130 before the other.

Unlike in this embodiment, when the leading and trailing ends of the contact type image sensor 108 are provided with the guided member 108*d*, neither of the points of the contact type image sensor 108, to which the guided members 108*d* are attached, coincides with the point of the contact type image sensor 108, at which the leading and trailing sides of the contact type image sensor 108 are equalized in weight, or the point of the contact type image sensor 108, to which the pressure from the pressure generating means converges, in terms of the moving direction of the contact type image sensor 108. Therefore, the contact type image sensor 108 is tilted as shown in FIG. 8, failing to be smoothly displaced downward from the original placement glass platen 107 or 109.

Further, as the contact type image sensor 108 becomes tilted as described above, the wall of the through-hole 108*c* and boss 103*g* scratch each other, as shown in FIG. 8, making it more difficult for the contact type image sensor 108 to be smoothly displaced downward from the original placement glass platen 107 or 109.

Further, in this embodiment, the guided member 108*d* is given a shaft-like shape (cylinder or circular column) to cause the guide member 108*d* to make linear contact (point contact in sectional view) with the guide 130, so that the amount of the inclination of the contact type image sensor 108 is minimized when the contact type image sensor 108 is displaced downward from the original placement glass platen 107 or 109.

This is for the following reason. If the dimension of the guided member 108*d* in terms of the moving direction of the contact type image sensor 108 is made relatively large compared to the dimension of the guided member 108*d* in terms of the direction perpendicular to the moving direction of the contact type image sensor 108, the behavior of the contact type image sensor 108 would be the same as that when the leading and trailing ends of the contact type image sensor 108 are provided with the guided member 108*d* as shown in FIG. 8.

Figure 10:
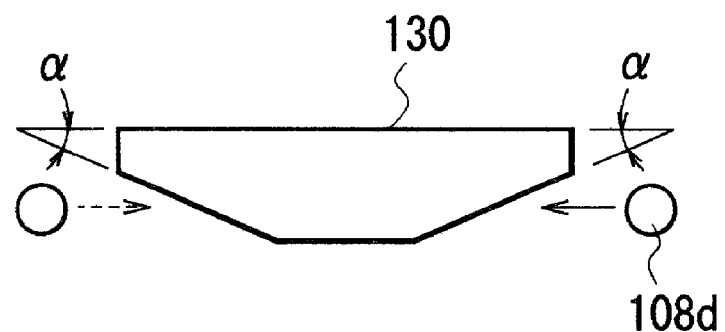
FIG. 10 is a side view of the image sensor displacement guide in the image reading apparatus in accordance with the present invention.

Next, referring to FIG. 10, the configuration of the contact type image sensor displacement guide 130 will be described. FIG. 10 is a side view of the guide 130.

In this embodiment, the inclination α, relative to the original placement glass platens 107 and 109, of the surface of the leading or trailing end portion of the contact type image sensor displacement guide 130, in terms of the primary moving direction of the contact type image sensor 108, that is, the first portion of the guide 130 with which the guided member 108*d* comes into contact when the contact type image sensor 108 is moved between the original placement glass platens 107 and 109, is set to an angle of no more than 30 deg.

This structural arrangement reduces the vibrations which occur when the spacer 108*a* of the contact type image sensor 108 comes into contact with the bottom surface of the original placement glass platen 107 or 109, making it possible for the contact type image sensor 108 to be smoothly displaced downward from the original placement glass platen 107 or 109, and placed back in contact with the original placement glass platen 109 or 107, respectively.

Figure 11:
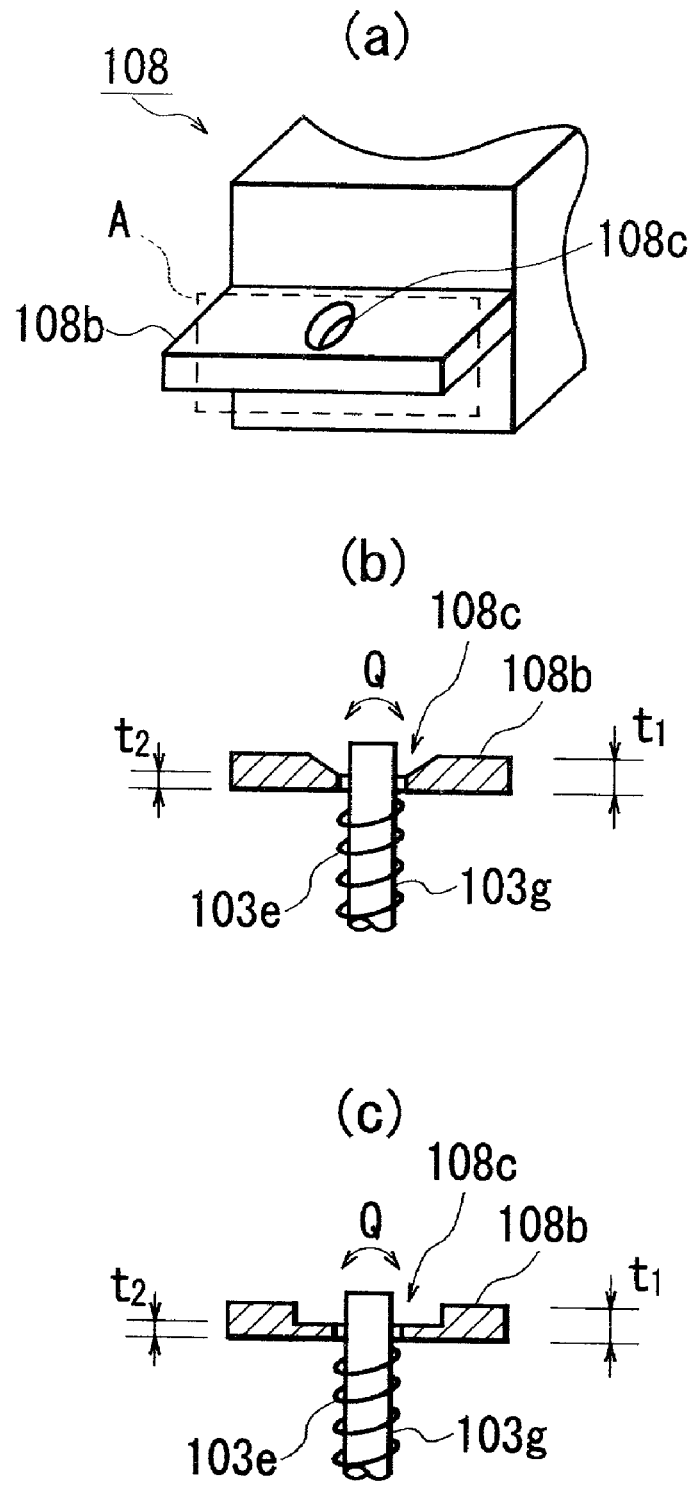
In FIG. 11, (a), (b), and (c) are schematic drawings showing the configuration and measurement of the through-hole of the horizontally protruding portion of the contact type image sensor in accordance with the present invention.

Next, referring to FIG. 11, the measurements and configuration of the through-hole of the protrusion 108b of the contact type image sensor 108 will be described. FIG. 11 is a schematic drawing for showing the measurements and configurations of two types of through-holes 108c. FIG. 11(a) is a perspective view of the portion of the contact type image sensor 108 adjacent to the through-hole 108c, and FIG. 11(b) is a section view of the contact type image sensor 108 at a plane A in FIG. 11(a). FIG. 11(c) is a sectional view of a contact type image sensor different in the configuration of the through-hole from the one in FIG. 11(b), at plane A in FIG. 11(a).

As shown in the drawings, in this embodiment, the thickness t2 of the lip portion of the through-hole 108c is set to be less than the thickness t1 of the protrusion 108b itself. More specifically, the thickness t2 was set to no more than 2 mm, whereas the thickness t1 was approximately 3 mm.

With the provision of this setup, the boss 103g was afforded more latitude in its tilting movement relative to the protrusion 108b in the direction indicated by an arrow mark Q in the drawing. Therefore, the amount of the scratching which occurs between the wall of the through-hole 108c and the boss 103g is reduced, making it possible to smoothly displace downward the contact type image sensor 108 from the original placement glass platen 107 or 109, and placed back in contact with the original placement glass platen 109 or 107, respectively.

Figure 12:
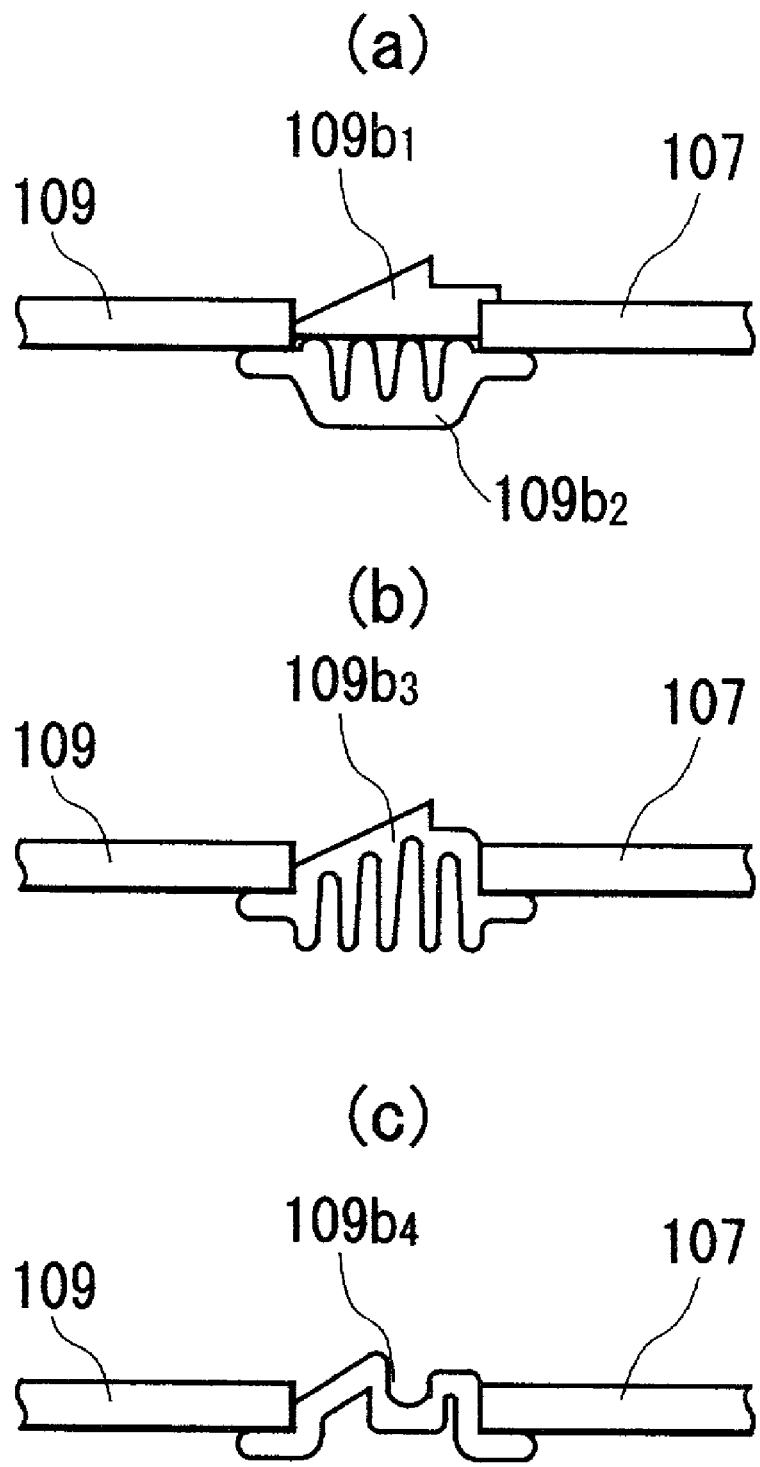
In FIG. 12, (a), (b), and (c) are schematic drawings showing the various jump step structures compatible with the image reading apparatus in accordance with the present invention.

Next, referring to FIG. 12, concrete examples of the configuration or the like of the jump step 109b will be described. FIG. 12 is a schematic drawing showing the various jump steps in accordance with the present invention, different in configuration.

As described above, the jump step 109b has only to be provided with the function as a guide for guiding an original in the form of a sheet, and the function as a stay.

Thus, the jump step 109b may be made up of two separate members: portion 109b1 which is molded of resinous material and functions as a jump step, and portion 109b2 which is formed by die casting and functions as a stay, as shown in FIG. 12(a).

The jump step 109b may be in the form of a monolithic member 109b3, as shown in FIG. 12(b), which is formed by die casting and has both of the above described two functions.

Further, the jump step 109b may be in the form of a jump step 109b4 formed of piece of metallic plate, as shown in FIG. 12(c).

Figure 13:
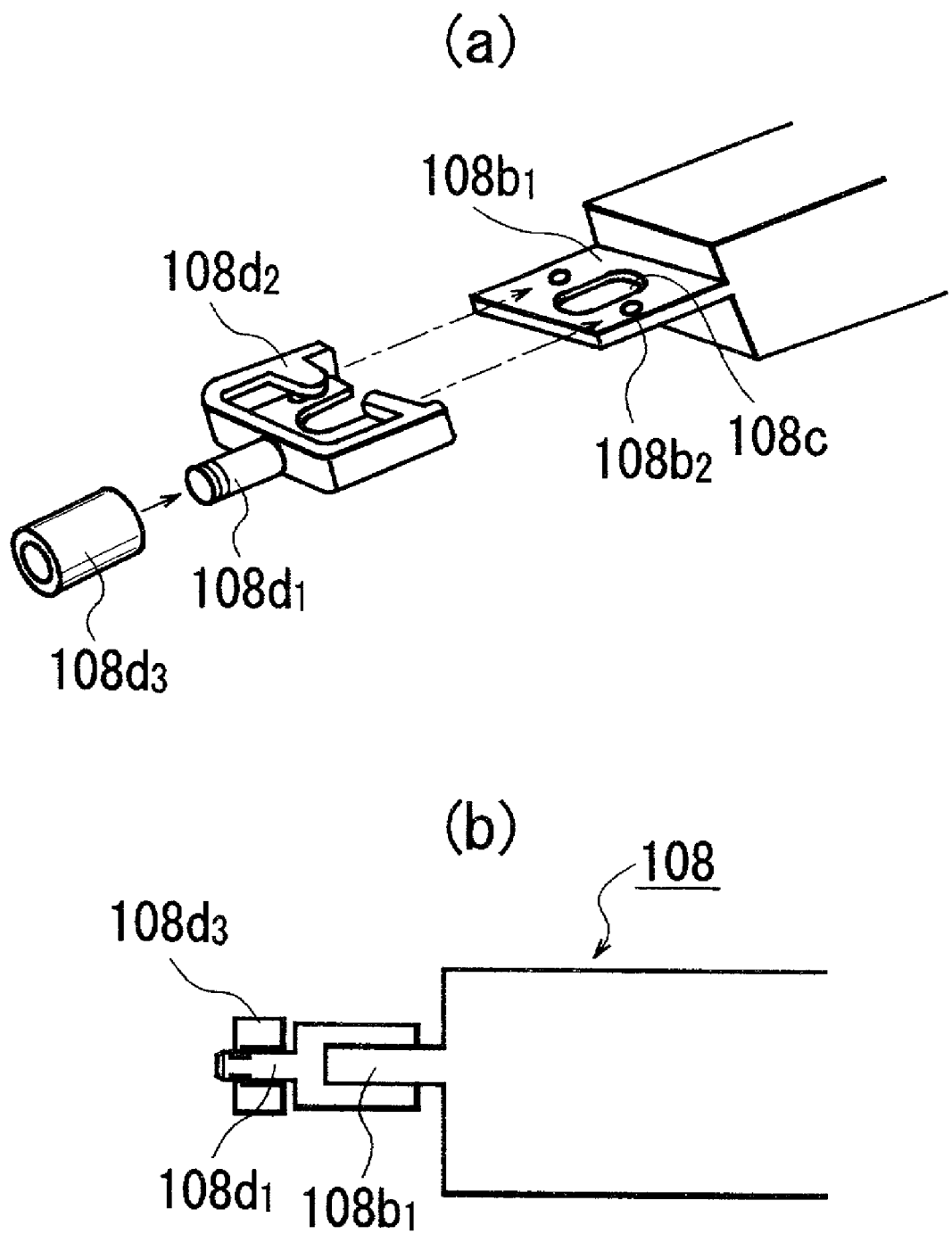
In FIG. 13, (a) and (b) are schematic drawings showing a concrete example of the guided member in the image reading portion in accordance with the present invention.
Figure 14:
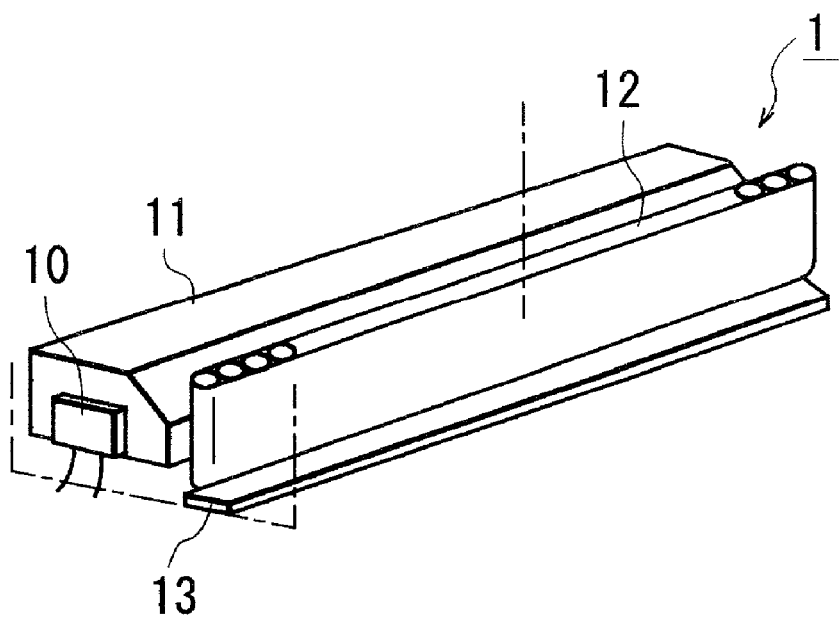
FIG. 14 is a schematic perspective view of a contact type image sensor.
Figure 15:
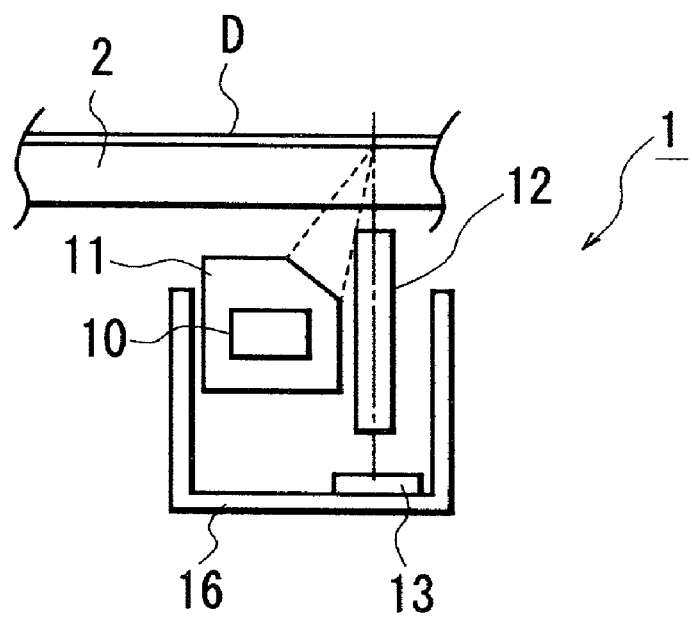
FIG. 15 is a sectional view of the contact type image sensor.
Figure 16:
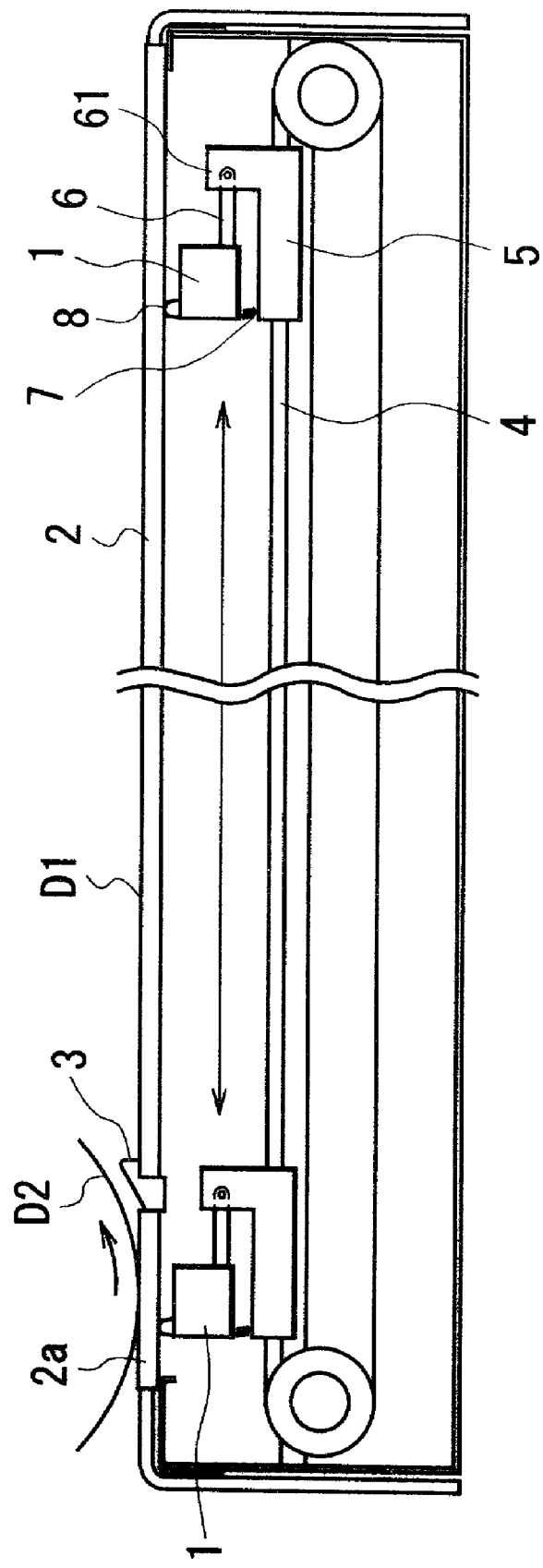
FIG. 16 is a vertical sectional view of an image reading apparatus based on prior arts, and shows the internal structure thereof.
Figure 17:
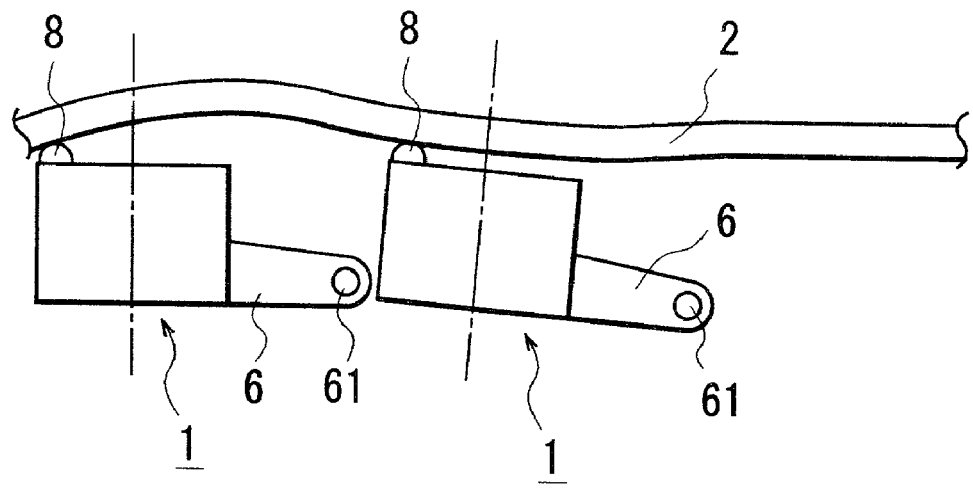
FIG. 17 is a schematic drawing for depicting the problem of the contact type image sensor based on the prior arts, which occurs when the contact type image sensor is moved.
Figure 18:
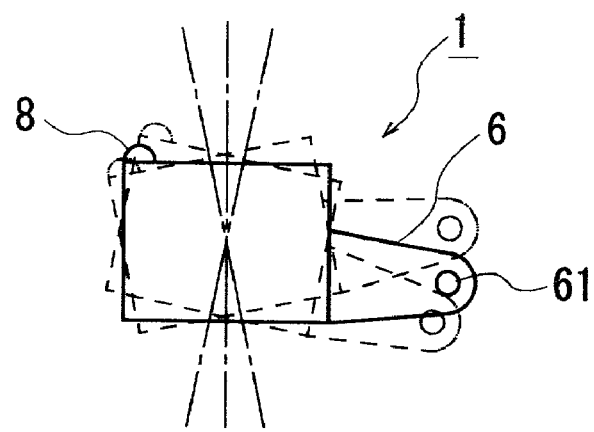
FIG. 18 is a schematic drawing for depicting the problem of the contact type image sensor based on the prior arts, which is caused by the component tolerance for the contact type image sensor based on the prior arts.

Next, referring to FIG. 13, a concrete example of the configuration for the guided member 108d in accordance with the present invention will be described. FIG. 13 is a schematic drawing showing a concrete example of the guided member 108d, (a) and (b) being perspective and sectional views, respectively.

As shown in the drawings, the guided member 108d comprises two members: rollers 108d3, and a member having both a shaft portion 108d1, around which the roller 108d3 is fitted, and a snap fitting portion 108d2. On the other hand, the protrusion 108b1 is provided with a pair of snap fit holes 108b2, which are located adjacent to the through-hole 108c, and into which the pair of actual snap fitting portions of the snap fitting portion fit. Therefore, the guided member 108d is easily attached to the protrusion 108b1.

While the invention has been described with reference to the structures disclosed herein, it is not confined to the details set forth, and this application is intended to cover such modifications or changes, regarding the measurements, materials, configurations, positional relationship, and the like, of the structural components, as may come within the purposes of the improvements or the scope of the following claims.

What is claimed is:

1. An image reading apparatus comprising:
   an image reading unit having image reading means for reading an image;
   a first original carriage for carrying an original and for reading an original image in contact with said image reading unit which is moving;
   a second original carriage for carrying an original and for reading an original image in contact with said image reading unit which is in a stationary state;
   a stay provided between said first original carriage and said second original carriage;
   urging means for urging said image reading unit toward said first original carriage or toward said second original carriage;
   a guide portion, provided outside an image reading region, for guiding said image reading unit away from said stay when said image reading unit moves between said first original carriage and said second original carriage; and
   a member to be guided slidable relative to said guide portion when said image reading unit moves between said first original carriage and said second original carriage, said member to be guided being disposed at a balanced position in a moving direction of said image reading unit and being substantially in line contact with said guide portion,
   wherein said guide portion has a first inclined surface or first curved surface for moving said image reading unit away from said stay upon movement from said first original carriage to said second original carriage, and a second inclined surface or second curved surface for moving said image reading unit away from said stay upon movement from said second original carriage to said first original carriage.

2. An apparatus according to claim 1, wherein an angle formed between said first original carriage and a tangent line of said first inclined surface or first curved surface and an angle formed between said second original carriage and a tangent line of said second inclined surface or second curved surface are not more than 30°.

3. An apparatus according to claim 1, wherein said guide portion is in the form of a semicircular projection.

4. An apparatus according to claim 1, wherein said member to be guided is in the form of a circular shaft member.

5. An apparatus according to claim 1, wherein said guide portion is provided at each of longitudinal ends of said stay, and said member to be guided is provided at each of longitudinal ends of said image reading unit.

6. An apparatus according to claim 1, further comprising a shaft for supporting said urging means, and said image unit is provided with a through-hole, through which said shaft is penetrated.

7. An apparatus according to claim 6, wherein said through-hole has a thinner thickness at a peripheral portion than at the other portion.

8. An apparatus according to claim 1, wherein said member to be guided is disposed at a position at which a weight balance is established in the moving direction of said image reading unit.

9. An apparatus according to claim 1, wherein said member to be guided is provided at a position where an urging force of said urging means is balanced.

10. An apparatus according to claim 1, wherein said member to be guided is disposed at a position where force applied by said guiding member is balanced.

11. An apparatus according to claim 1, wherein a product of a geometrical moment of inertia of said stay and a Young's modulus thereof is not less than $6.5 \times 10^6$ kg.mm$^2$.

12. An apparatus according to claim 1, wherein said image reading unit includes projecting means for projecting light to the original and a lens for directing light reflected by the original to the image reading means.

13. An apparatus according to claim 1, wherein said image reading apparatus is usable with an image forming apparatus having an image forming means for forming on a recording material an image corresponding to an original read by said image reading apparatus.

* * * * *

UNITED STATES PATENT AND TRADEMARK OFFICE
CERTIFICATE OF CORRECTION

PATENT NO. : 7,016,088 B2
APPLICATION NO. : 10/050852
DATED : March 21, 2006
INVENTOR(S) : Masahiko Yokota et al.

It is certified that error appears in the above-identified patent and that said Letters Patent is hereby corrected as shown below:

COLUMN 1
Line 10, "well" should read --well as--.

COLUMN 2
Line 41, "potion" should read --portion--.

COLUMN 9
Line 7, "stop" should read --step--.

COLUMN 14
Line 2, "protrusion 108b1." should read --protrusion 108b1.
　　　The guided member 108d is attached to the protrusion 108b1 in a manner to sandwich the protrusion 108b1 with the top and bottom sides of the snap fitting portion 108d2. Therefore, the guide member 108d does not become loose relative to the protrusion 108b1.--.

Signed and Sealed this

Thirteenth Day of March, 2007

JON W. DUDAS
*Director of the United States Patent and Trademark Office*